(12) United States Patent
Hirose (10) Patent No.: US 9,401,526 B2
(45) Date of Patent: Jul. 26, 2016

(54) POWER STORAGE DEVICE

(71) Applicant: KABUSHIKI KAISHA TOYOTA JIDOSHOKKI, Kariya-shi, Aichi-ken (JP)

(72) Inventor: Takayuki Hirose, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 2 days.

(21) Appl. No.: 14/397,504

(22) PCT Filed: Apr. 30, 2013

(86) PCT No.: PCT/JP2013/062559
§ 371 (c)(1),
(2) Date: Oct. 28, 2014

(87) PCT Pub. No.: WO2013/164998
PCT Pub. Date: Nov. 7, 2013

(65) Prior Publication Data
US 2015/0125738 A1 May 7, 2015

(30) Foreign Application Priority Data

May 1, 2012 (JP) ................................ 2012-104833

(51) Int. Cl.
*H01M 10/04* (2006.01)
*H01M 2/14* (2006.01)
(Continued)

(52) U.S. Cl.
CPC ........... *H01M 10/0472* (2013.01); *H01G 11/04* (2013.01); *H01G 11/26* (2013.01);
(Continued)

(58) Field of Classification Search
CPC ................ B63H 2005/1258; B63H 20/007; B63H 20/28; B63H 20/285; H01M 2/00; H01M 2200/00; H01M 4/02; H01M 10/0472; H01M 2/14; H01M 2/266; H01M 10/0463; H01M 10/0525; H01M 10/0585; H01M 4/64; H01G 11/04; H01G 11/26; H01G 11/52; Y02E 60/122

USPC ........................................................ 429/152
See application file for complete search history.

(56) References Cited

U.S. PATENT DOCUMENTS

| 6,335,114 B1 | 1/2002 | Ueshima et al. | |
|---|---|---|---|
| 2012/0202105 A1* | 8/2012 | Shinyashiki | H01M 2/22 429/153 |
| 2013/0017424 A1 | 1/2013 | Ahn | |

FOREIGN PATENT DOCUMENTS

| EP | 2437330 A1 | 4/2012 |
|---|---|---|
| JP | 11-086833 A | 3/1999 |

(Continued)

OTHER PUBLICATIONS

Communication dated Mar. 27, 2015 from the European Patent Office in counterpart European Application No. 13784644.0.
International Preliminary Report on Patentability issued by the International Searching Authority in counterpart International application No. PCT/JP2013/062559.
International Search Report of PCT/JP2013/062559, dated Jun. 25, 2013. [PCT/ISA/210].

*Primary Examiner* — Jonathan Jelsma
*Assistant Examiner* — Rashid Alam
(74) *Attorney, Agent, or Firm* — Sughrue Mion, PLLC (57) ABSTRACT

A power storage device includes positive electrodes, negative electrodes separators each of which is located between a positive electrode and a negative electrode and insulates the positive electrode and the negative electrode from each other, and an electrode assembly, which is configured by stacking the positive electrodes, the negative electrodes, and the separators. The power storage device further includes an insulating member including sandwiching portions. Each sandwiching portion is formed by two insulating portions that sandwich a positive electrode non-application portion from both sides in the stacking direction of the electrode assembly. When viewed in the stacking direction of the electrode assembly, each insulating portion is arranged at least between a positive electrode border and a negative electrode border.

6 Claims, 7 Drawing Sheets

(51) Int. Cl.
*H01M 2/26* (2006.01)
*H01M 10/0525* (2010.01)
*H01G 11/04* (2013.01)
*H01G 11/26* (2013.01)
*H01G 11/52* (2013.01)
*H01M 4/64* (2006.01)
*H01M 10/0585* (2010.01)

(52) U.S. Cl.
CPC ................ *H01G 11/52* (2013.01); *H01M 2/14* (2013.01); *H01M 2/266* (2013.01); *H01M 4/64* (2013.01); *H01M 10/0463* (2013.01); *H01M 10/0525* (2013.01); *H01M 10/0585* (2013.01); *Y02E 60/122* (2013.01)

(56) References Cited

FOREIGN PATENT DOCUMENTS

| | | |
|---|---|---|
| JP | 2000-260478 A | 9/2000 |
| JP | 2004-303590 A | 10/2004 |
| JP | 2006-32112 A | 2/2006 |
| JP | 2007-257859 A | 10/2007 |
| JP | 2009-266467 A | 11/2009 |
| JP | 2011-216403 A | 10/2011 |
| JP | 2012-14935 A | 1/2012 |
| JP | 2013-20968 A | 1/2013 |
| JP | 2013-80563 A | 5/2013 |

\* cited by examiner

POWER STORAGE DEVICE

CROSS REFERENCE TO RELATED APPLICATIONS

This application is a National Stage of International Application No. PCT/JP2013/062559 filed Apr. 30, 2013, claiming priority based on Japanese Patent Application No. 2012-104833, filed May 1, 2012, the contents of all of which are incorporated herein by reference in their entirety.

FIELD OF THE INVENTION

The present invention relates to a power storage device.

BACKGROUND OF THE INVENTION

In the prior art, a lithium-ion rechargeable battery and a nickel-metal hydride rechargeable battery, for example, are each known as a rechargeable battery that is a type of a power storage device. For example, in the lithium-ion rechargeable battery, electrodes each including a metal thin board with a surface to which an active material is applied to form an active material layer are stacked with a separator located therebetween. This forms an electrode assembly, which is accommodated in a case.

In some of the lithium-ion rechargeable batteries, thermosetting resin is applied to each side surface of the electrode assembly in which bipolar type electrodes and separators are stacked to form a resin layer, and the resin layer seals the edge portions of the metal thin boards and the separators exposed on each side surface of the electrode assembly. Refer to Patent Document 1. According to the rechargeable battery of Patent Document 1, the resin layer limits thermal shrinkage of the separators. Further, even if the separators are subjected to thermal shrinkage, the resin layer prevents contact between the metal thin boards of the bipolar type electrodes that are adjacent to each other.

PRIOR ART DOCUMENT

Patent Document

Patent Document 1: Japanese Laid-Open Patent Publication No. 2007-257859

SUMMARY OF THE INVENTION

In some of the above lithium-ion rechargeable batteries, the positive electrodes and the negative electrodes are separately formed, and in each of the positive electrodes and the negative electrodes, a current collector member electrically connects non-application portions, which are free from an active material, with an external terminal provided on a case. In the lithium-ion rechargeable batteries, it is known that when the metal thin board of a positive electrode and the active material layer of a negative electrode are short-circuited due to melting or damaging of each separator, the heat at the short-circuit portion is increased since the internal resistance value as a lithium-ion rechargeable battery and the resistance value at the short-circuit portion are close to each other.

Even in the case of the lithium-ion rechargeable battery in which the positive electrodes and the negative electrodes are separately formed, as in Patent Document 1, it is considered that a resin layer is formed on each side surface of the electrode assembly to fix metal thin boards of the positive electrodes, and prevents short-circuit between the metal thin board of each positive electrode and the active material layer of the corresponding negative electrode.

However, according to the structure of Patent Document 1, each side surface of the electrode assembly is immersed in an uncured resin to form a resin layer. Thus, after forming the resin layer on the non-application portions to which the current collector member is connected, it is difficult to connect the current collector member to the non-application portions. Further, when the resin layer is formed after the current collector member is connected to the non-application portions, it is necessary to apply a masking such that the current collector member to be connected to the external terminal is free from the resin layer. This complicates the steps.

An objective of the present invention is to provide a power storage device that prevents short-circuit between a positive electrode non-application portion, which is free from a positive active material, in each positive electrode and a negative electrode application portion, to which a negative active material is applied, in each negative electrode, and can be easily manufactured.

In order to achieve the above described objective, a power storage device comprising: one or more positive electrodes; one or more negative electrodes; one or more separators; and an electrode assembly formed by stacking the positive electrodes, the negative electrodes, and the separators is provided. The separators each are located between a positive electrode and a negative electrode to insulate the positive electrode and the negative electrode from each other. Each positive electrode includes a positive electrode metal thin board, a positive electrode application portion formed by applying a positive active material on a surface of the positive electrode metal thin board, a positive electrode non-application portion that is free from the positive active material, and a positive electrode border as a border between the positive electrode application portion and the positive electrode non-application portion. Each negative electrode includes a negative electrode metal thin board, a negative electrode application portion formed by applying a negative active material on a surface of the negative electrode metal thin board, a negative electrode non-application portion that is free from the negative active material, and a negative electrode border as a border between the negative electrode application portion and the negative electrode non-application portion. Each positive electrode non-application portion and the negative electrode non-application portion are located at the same side in the electrode assembly, and the positive electrode border is located closer to the negative electrode application portion than the negative electrode border. The power storage device further comprises an insulating member including one or more sandwiching portions. Each sandwiching portion is formed by two insulating portions that sandwich the positive electrode non-application portion from both sides in a stacking direction of the electrode assembly. When viewed in the stacking direction of the electrode assembly, each insulating portion is arranged at least between the positive electrode border and the negative electrode border.

Accordingly, the positive electrode non-application portions in the positive electrodes and the negative electrode non-application portions in the negative electrodes are located at the same side in the electrode assembly. The positive electrode border as a border between each positive electrode non-application portion and each positive electrode application portion is closer to the corresponding negative electrode application portion than the negative electrode border as a border between each negative electrode non-application portion and each negative electrode application portion.

Accordingly, each positive electrode non-application portion and a part of the corresponding negative electrode application portion face each other across the corresponding separator in the stacking direction of the electrode assembly.

This limits the depositing of metallic lithium caused by a portion of each positive electrode application portion that does not face the corresponding negative electrode application portion.

According to the present aspect, an insulating member with the sandwiching portions each configured by the two insulating portions that sandwich the corresponding positive electrode non-application portion is provided. When viewed in the stacking direction of the electrode assembly, each insulating portion is arranged at least between the positive electrode border and the negative electrode border. That is, each insulating portion that configures the sandwiching portion is located between the corresponding positive electrode non-application portion and the corresponding negative electrode application portion. This prevents short-circuit between each positive electrode non-application portion, which is free from the positive active material, in the positive electrode and the corresponding negative electrode application portion, to which the negative active material is applied, in the negative electrode even if the corresponding separator is melted or damaged. The insulating member is coupled to the electrode assembly such that the two insulating portions sandwich the corresponding positive electrode non-application portion. This provides an insulating portion between each positive electrode non-application portion and the corresponding negative electrode application portion. Accordingly, an insulating portion is provided between each positive electrode non-application portion and the corresponding negative electrode application portion in each case of before and after connecting a current collection terminal to the positive electrode non-application portions. This improves the flexibility of the manufacturing process and facilitates the manufacturing.

DETAILED DESCRIPTION OF THE PREFERRED EMBODIMENTS

One embodiment of the present invention will now be described with reference to FIGS. 1 to 6.

Figure 1:
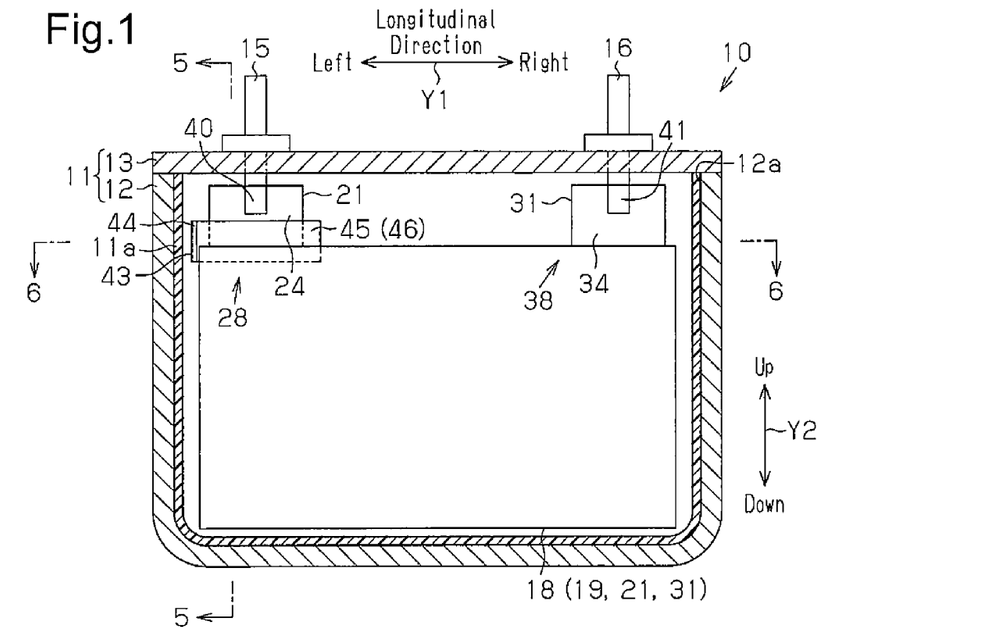
FIG. 1 is a cross-sectional view schematically illustrating a lithium-ion rechargeable battery.

As shown in FIG. 1, a lithium-ion rechargeable battery (hereinafter, referred to as only rechargeable battery) 10 as a power storage device mounted on a vehicle (e.g., an industrial vehicle and a passenger vehicle) includes a case 11, which forms a generally box shape and has a low profile as a whole. The case 11 includes a tube-like (tetragonal tube-like in the present embodiment) main body member 12 with a closed end, and a cover member 13, which is coupled to the main body member 12 to seal an opening 12a. The cover member 13 is shaped as a tetragonal flat plate in a planar view. The main body member 12 and the cover member 13 are each formed from metal (for example, stainless steel or aluminum). Hereinafter, in the following description, the longitudinal direction of the case 11 indicated by arrow Y1 is shown as a right-left direction or a lateral direction. The heightwise direction of the case 11 indicated by arrow Y2 is shown as an up-down direction or a vertical direction. The direction parallel with the short sides of the case 11 indicated by arrow Y3 in FIG. 2 is shown as a front-rear direction.

A generally cylindrical positive terminal 15 and a negative terminal 16 protrude from an outer surface (upper surface) of the cover member 13. The positive terminal 15 and the negative terminal 16 are insulated from the case 11 (main body member 12 and cover member 13). The rechargeable battery 10 according to the present embodiment is charged and discharged through the positive terminal 15 and the negative terminal 16 as external terminals.

Further, the case 11 (main body member 12) accommodates an electrode assembly 18, which forms a generally box shape and has a low profile as a whole in the right-left direction. The electrode assembly 18 includes a plurality of positive electrode sheets 21, which serve as a positive electrode, a plurality of negative electrode sheets 31, which serve as a negative electrode, and a plurality of sheet-like separators (partitions) 19, each of which is arranged between an adjacent pair of the positive electrode sheet 21 and the negative electrode sheet 31 to insulate the positive electrode sheet 21 and the negative electrode sheet 31 from each other. The electrode assembly 18 has a layered structure in which the positive electrode sheets 21, the negative electrode sheets 31, and the separators 19 are stacked. The case 11 accommodates the electrode assembly 18, which is covered with an insulation bag 11a that is formed from an insulating material. Further, the case 11 is filled with an electrolyte (electrolytic solution).

Figure 2:
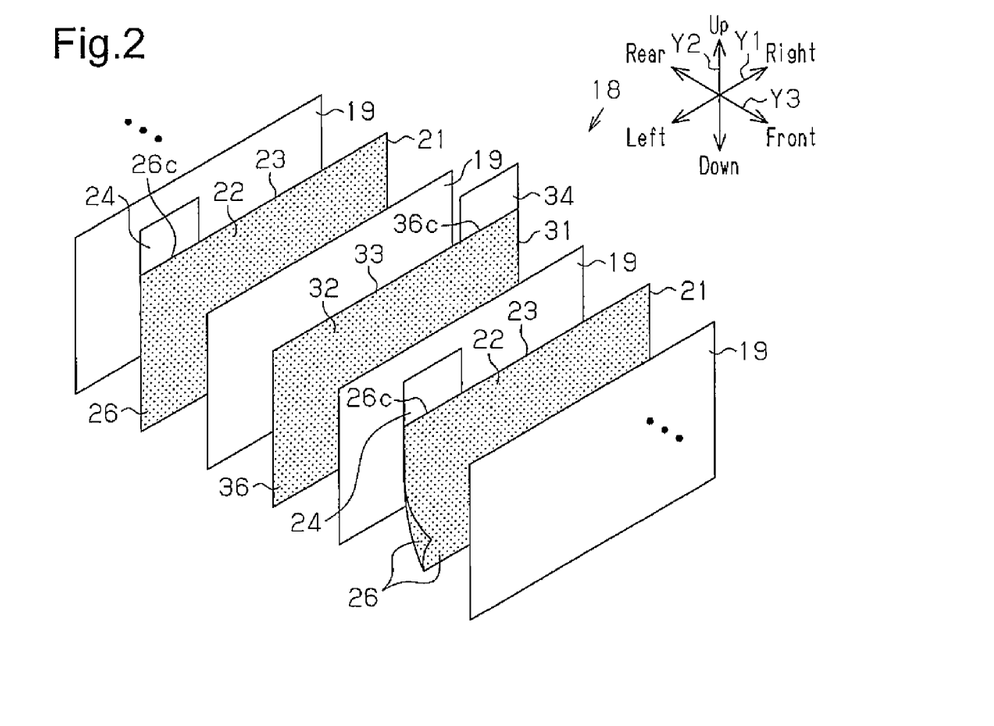
FIG. 2 is an exploded perspective view schematically illustrating an electrode assembly.

As shown in FIG. 2, each positive electrode sheet 21 includes a rectangular sheet-like positive electrode metal foil 22. Further, each negative electrode sheet 31 includes a rectangular sheet-like negative electrode metal foil 32. In the present embodiment, each positive electrode metal foil 22 is formed from, for example, aluminum, and each negative electrode metal foil 32 is formed from, for example, copper.

Figure 3A:
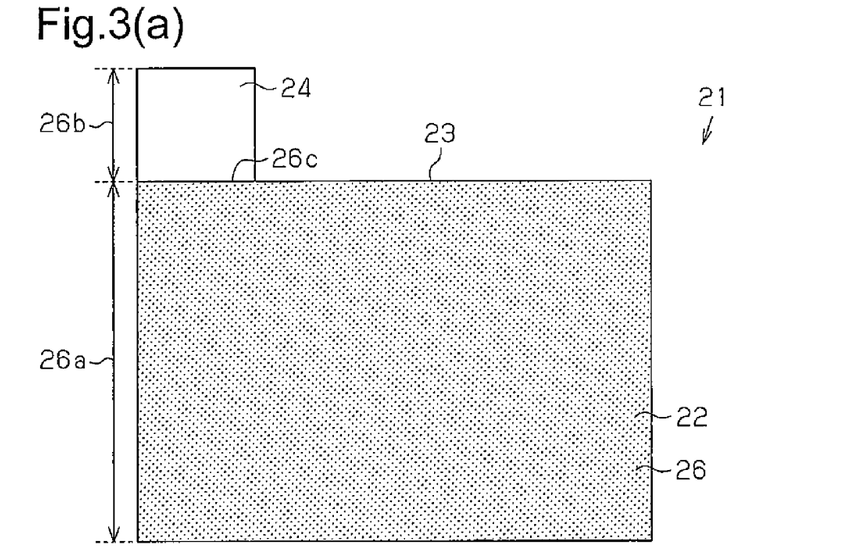
FIG. 3(a) is a front view illustrating a positive electrode sheet.

As shown in FIG. 3(a), a tetragonal positive electrode lead portion 24 in a front view extends upward from a positive electrode upper edge 23, which is an upper edge portion of each positive electrode metal foil 22. The positive electrode lead portion 24 is integrated with each positive electrode metal foil 22 on the left end of the positive electrode upper edge 23. In the present embodiment, the positive electrode metal foil 22 and the positive electrode lead portion 24 configure a positive electrode metal thin board (metal sheet).

An active material mixture including a positive active material is applied to each of the two entire surfaces (front surface and rear surface) of the positive electrode metal foil 22 so that each of the two surfaces includes a positive active material layer 26 including a positive active material. In the present embodiment, the region where the positive active material layer 26 is formed is a positive electrode application portion 26a to which the positive active material is applied. In contrast, the two surfaces of the positive electrode lead portion 24 are free from the positive active material layer 26. The positive electrode lead portion 24 is a positive electrode non-application portion 26b that is free from the positive active material. The two surfaces of the positive electrode sheet 21 each include a positive electrode border 26c between the positive electrode application portion 26a and the positive electrode non-application portion 26b.

Figure 3B:
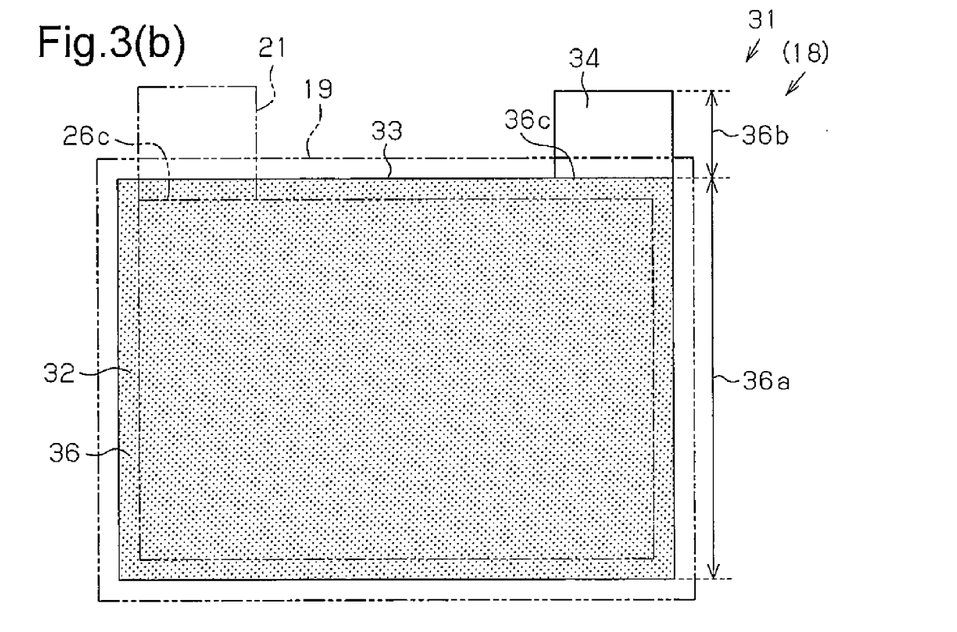
FIG. 3(b) is a front view illustrating a negative electrode sheet.

As shown in FIG. 3(b), a tetragonal negative electrode lead portion 34 in a front view extends upward from a negative electrode upper edge 33, which is an upper edge portion of each negative electrode metal foil 32. The negative electrode lead portion 34 is integrated with each negative electrode metal foil 32 on the right end of the negative electrode upper edge 33. In the present embodiment, the negative electrode metal foil 32 and the negative electrode lead portion 34 configure a negative electrode metal thin board (metal sheet).

An active material mixture including a negative active material is applied to each of the two entire surfaces (front surface and rear surface) of the negative electrode metal foil 32 so that each of the two surfaces includes a negative active material layer 36 including a negative active material. In the present embodiment, the region where the negative active material layer 36 is formed is a negative electrode application portion 36a to which the negative active material is applied. In contrast, the two surfaces of the negative electrode lead portion 34 are free from the negative active material layer 36. The negative electrode lead portion 34 is a negative electrode non-application portion 36b that is free from the negative active material. The two surfaces of the negative electrode sheet 31 each include a negative electrode border 36c between the negative electrode application portion 36a and the negative electrode non-application portion 36b.

The size (length) of the positive electrode metal foil 22 (positive electrode application portion 26a) in the direction (right-left direction) perpendicular to the direction in which the positive electrode lead portion 24 extends is less than the size of the negative electrode metal foil 32 (negative electrode application portion 36a) in the direction (right-left direction) perpendicular to the direction in which the negative electrode lead portion 34 extends. The size of the positive electrode metal foil 22 (positive electrode application portion 26a) in the direction (up-down direction) in which the positive electrode lead portion 24 extends is less than the size of the negative electrode metal foil 32 (negative electrode application portion 36a) in the direction (up-down direction) in which the negative electrode lead portion 34 extends.

The separator 19, which is formed from an insulative resin material, is a rectangular porous sheet having an extremely fine porous structure. The size of the separator 19 in the up-down direction is greater than each of the sizes of the positive electrode metal foil 22 and the negative electrode metal foil 32 in the up-down direction. The size of the separator 19 in the right-left direction is greater than each of the sizes of the positive electrode metal foil 22 and the negative electrode metal foil 32 in the right-left direction.

As shown in FIG. 2, the electrode assembly 18 is configured such that the positive electrode sheet 21 and the negative electrode sheet 31, which have the separator 19 located in between, are stacked in the front-rear direction (thickness direction). In the present embodiment, the front-rear direction, which is indicated by arrow Y3, is the stacking direction of the positive electrode sheet 21 and the negative electrode sheet 31 in the electrode assembly 18.

The negative electrode upper edge 33, from which the negative electrode lead portion 34 extends in the negative electrode sheet 31, and the positive electrode upper edge 23, from which the positive electrode lead portion 24 extends in the positive electrode sheet 21, are located at the same side of the electrode assembly 18 (in the present embodiment, the upper side where the cover member 13 is located).

Accordingly, as shown in FIG. 1, in the electrode assembly 18, on the left side of the upper end portion, a positive current collector 28 extends upward and serves as a current collector (a group of leads) having a layered structure in which the positive electrode lead portions 24 are stacked without the separator 19 arranged between each pair of the positive electrode lead portions 24. Further, the electrode assembly 18 includes, on the right side of the upper end portion, a negative current collector 38, which serves as a current collector (a group of leads) having a layered structure in which a plurality of the negative electrode lead portions 34 are stacked without the separator 19 arranged between each pair of the negative electrode lead portions 34. Accordingly, the positive current collector 28 (positive electrode lead portions 24) and the negative current collector 38 (negative electrode lead portions 34) are located at the same side of the electrode assembly 18.

As shown in FIG. 3 (b), in the electrode assembly 18, the positive electrode sheet 21 and the negative electrode sheet 31 are stacked in the state where the positive electrode metal foil 22 (positive electrode application portion 26a) is included in the negative electrode metal foil 32 (negative electrode application portion 36a) when viewed in the stacking direction of the electrode assembly 18.

In the electrode assembly 18, the positive electrode border 26c is formed at a position closer to the negative electrode application portion 36a from the negative electrode border 36c, that is, on the lower edge side opposite to the negative electrode upper edge 33. That is, the positive electrode border 26c is included in the negative electrode application portion 36a of the negative electrode sheet 31 when viewed from the stacking direction of the electrode assembly 18. The positive electrode metal foil 22 (positive electrode application portion 26a) and the negative electrode metal foil 32 (negative electrode application portion 36a) are included in the separator 19 when viewed from the stacking direction of the electrode assembly 18.

As shown in FIG. 1, a positive current collection terminal 40, which serves as a current collection member, is coupled to the positive current collector 28 (positive electrode lead portions 24). The positive current collection terminal 40 is electrically connected to the positive current collector 28. The positive current collection terminal 40 is also electrically connected to the above positive terminal 15. A negative current collection terminal 41, which serves as a current collection member, is coupled to the negative current collector 38 (negative electrode lead portions 34). The negative current collection terminal 41 is electrically connected to the negative current collector 38. The negative current collection terminal 41 is also electrically connected to the above negative terminal 16.

The rechargeable battery 10 according to the present embodiment includes an insulating member 43 for restricting, i.e., preventing short-circuit, i.e., contact between the positive electrode lead portion 24 (positive electrode non-application portion 26b) and the negative active material layer 36 (negative electrode application portion 36a) when the separator 19 is melted or damaged. Hereinafter, the insulating member 43 will be described in details.

Figure 4A:
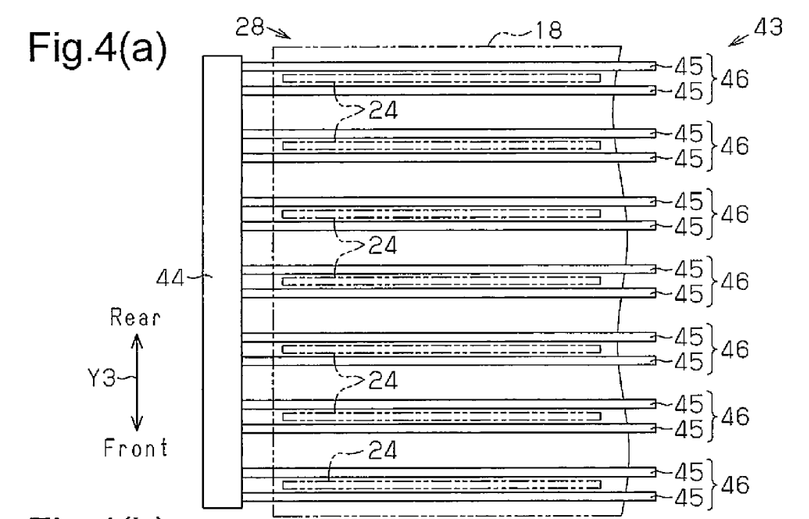
FIG. 4(a) is a plan view illustrating an insulating member.
Figure 4B:
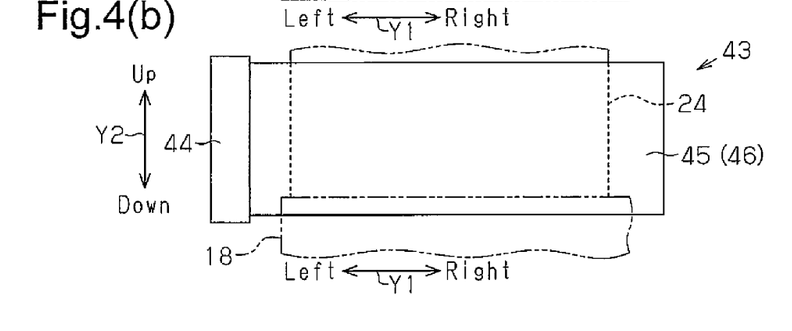
FIG. 4(b) is a front view illustrating the insulating member.
Figure 4C:
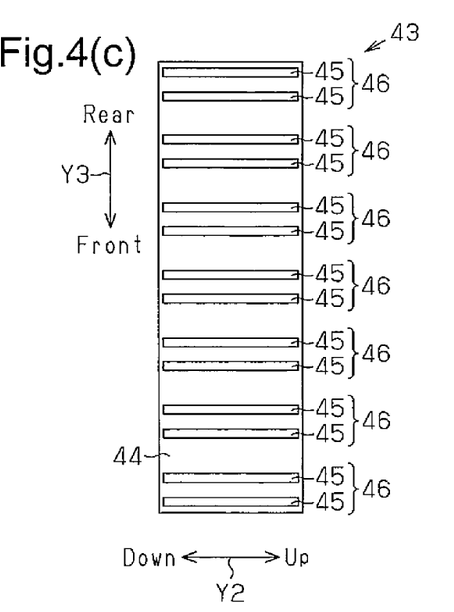
FIG. 4(c) is a right side view illustrating the insulating member.

As shown in FIGS. 4(a) to 4(c), the insulating member 43 includes a tetragonal flat plate-like coupling portion 44 in a side view, which extends along the side surface (left side surface in the present embodiment) of the positive current collector 28 in the right-left direction, and in the stacking direction (front-rear direction) in the electrode assembly 18.

A plurality of tetragonal flat plate-like (thin plate-like) insulating portions 45 in a front view extend from a surface (right side surface) of the coupling portion 44 facing the positive current collector 28 in the planar direction of the positive electrode lead portions 24, more specifically, in the direction (right-left direction, hereinafter referred to as only width direction) perpendicular to the direction in which the positive electrode lead portions 24 extend. That is, the coupling portion 44 according to the present embodiment couples basal ends of the insulating portions 45.

Each insulating portion 45 is substantially parallel with the corresponding positive electrode lead portion 24. The size of each insulating portion 45 in the right-left direction is greater than the size of each positive electrode lead portion 24 in the width direction. The size of each insulating portion 45 in the direction in which the corresponding positive electrode lead portion 24 extends is less than the size of the positive electrode lead portion 24 in the direction in which the positive electrode lead portion 24 extends.

In the insulating member 43, each adjacent pair of the insulating portions 45 configures a sandwiching portion 46, which sandwiches the corresponding positive electrode lead portion 24. FIG. 4 shows seven of the sandwiching portions 46 (seven pairs of the insulating portions 45) for the purpose of illustration. Actually, the number of the sandwiching portions 46 included in the insulating member 43 corresponds to (is the same as) the number of the positive electrode lead portions 24 (positive electrode sheets 21), which configure the positive current collector 28. For example, when the positive current collector 28 is configured by eighty positive electrode lead portions 24 (positive electrode sheets 21), eighty sandwiching portions 46 are provided in the insulating member 43.

Figure 5:
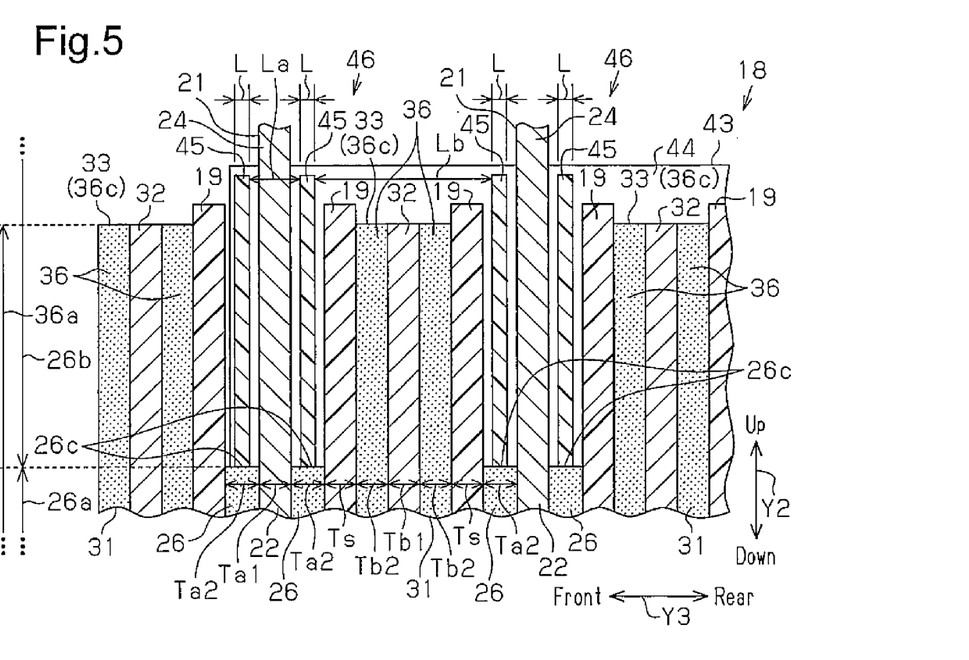
FIG. 5 is a cross-sectional view taken along line 5-5 of FIG. 1.
Figure 6:
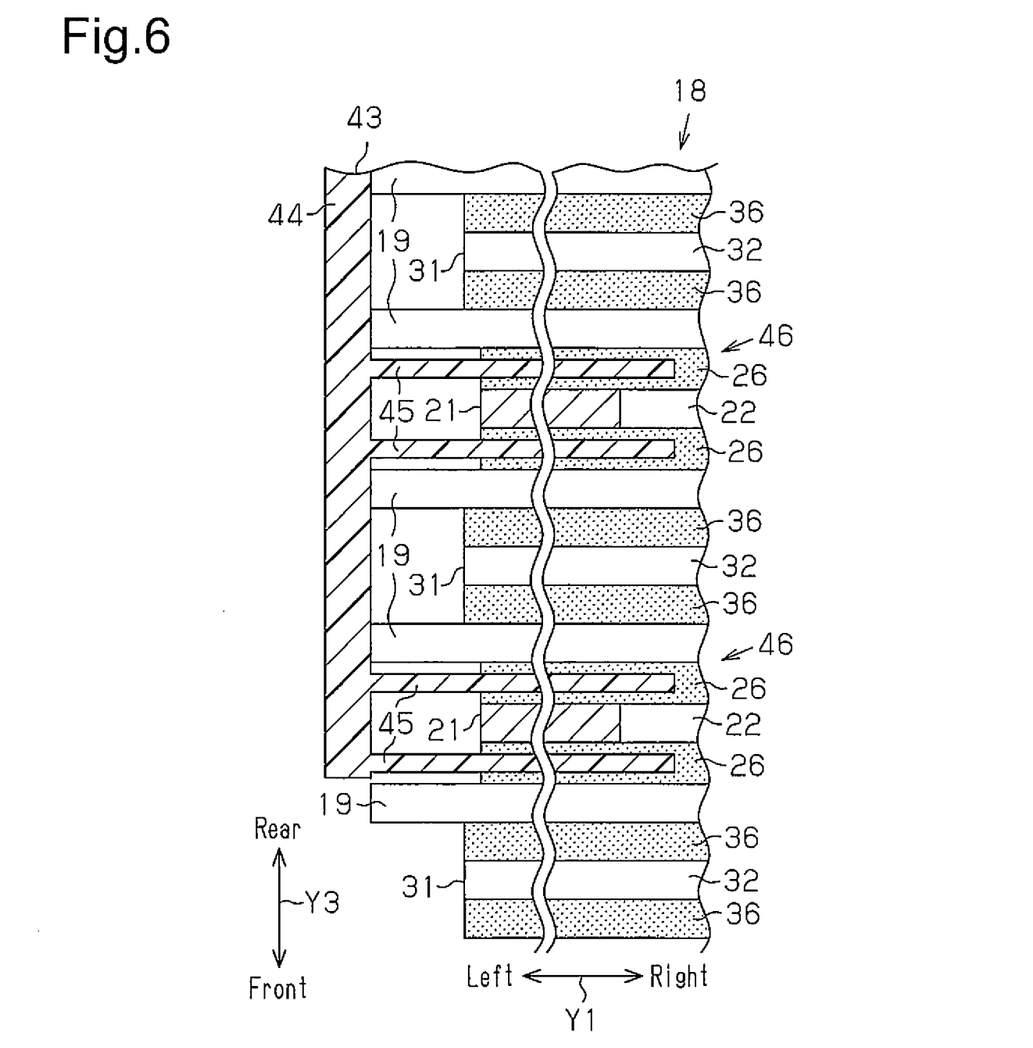
FIG. 6 is a cross-sectional view taken along line 6-6 of FIG. 1.

As shown in FIGS. 5 and 6, the insulating member 43 according to the present embodiment is coupled to the positive current collector 28 (electrode assembly 18) in the state where each insulating portion 45 is located between the corresponding positive electrode lead portion 24 (positive electrode metal foil 22) and the separator 19. That is, the insulating member 43 is coupled to the positive current collector 28 in the state where the positive electrode lead portion 24 is located between the two insulating portions 45 that configure the sandwiching portion 46 in the stacking direction of the electrode assembly 18.

As shown in FIG. 5, the positive electrode metal foil 22 is formed smaller than the negative electrode metal foil 32. Accordingly, the positive electrode lead portion 24 is located adjacent to the negative active material layer 36 across the separator 19 in the stacking direction of the electrode assembly 18. In the state where the insulating member 43 is coupled to the positive current collector 28, the lower end portion of each insulating portion 45 substantially contacts the upper end (positive electrode border 26c) of the positive active material layer 26, and the upper end portion of each insulating portion 45 is arranged above the upper end portion of each of the negative electrode metal foil 32 (negative electrode application portion 36a) and the separator 19.

Accordingly, in each sandwiching portion 46, each insulating portion 45 is located at least between the positive electrode border 26c and the negative electrode border 36c when viewed in the stacking direction of the electrode assembly 18. More specifically, in each sandwiching portion 46, each insulating portion 45 covers the entire corresponding positive electrode lead portion 24 (negative electrode non-application portion 36b) located between the positive electrode border 26c and the negative electrode border 36c over the entire range in which the positive electrode border 26c extends when viewed in the stacking direction of the electrode assembly 18.

The relationship between the size of each portion of the insulating member 43 and the size of each portion of the positive electrode sheets 21, the negative electrode sheets 31, and the separators 19, which configure the electrode assembly 18, according to the present embodiment will be described in details.

As shown in FIG. 5, the thickness L of each insulating portion 45 in the stacking direction of the electrode assembly 18 is less than the thickness Ta2 of the positive active material layer 26 in the positive electrode application portion 26a. That is, the formula $L<Ta2$ is established where the thickness of each insulating portion 45 is denoted by L and the thickness of the positive active material layer 26 is denoted by Ta2. The formula $Ta1 \leq La \leq Ta1+(Ta2-L) \times 2$ is established where the distance between the two insulating portions 45 is denoted by La, the thickness of each insulating portion 45 is denoted by L, the thickness of the positive electrode metal foil 22 is denoted by Ta1, and the thickness of the positive active material layer 26 is denoted by Ta2 in the stacking direction of the electrode assembly 18.

The formula $Tb1+(Tb2+Ts) \times 2 \leq Lb \leq Tb1+(Tb2+Ts+Ta2-L) \times 2$ is established where the distance between the adjacent pair of the sandwiching portions 46 is denoted by Lb, the thickness of each insulating portion 45 is denoted by L, the thickness of the positive active material layer 26 is denoted by Ta2, the thickness of the negative electrode metal foil 32 is denoted by Tb1, the thickness of the negative active material layer 36 is denoted by Tb2, and the thickness of the separator in the stacking direction of the electrode assembly 18 is denoted by Ts.

Next, operations of the rechargeable battery 10 according to the present embodiment will be described.

In the present embodiment, the positive electrode lead portions 24 (positive electrode non-application portion 26b) and the negative electrode lead portions 34 (negative electrode non-application portion 36b) are located at the same side in the electrode assembly 18, and the positive electrode border 26c is located closer to the negative electrode application portion 36a (negative active material layer 36) than the negative electrode non-application portion 36b. Accordingly, the positive electrode lead portion 24 and a part of the negative electrode application portion 36a face each other across the separator 19 in the stacking direction of the electrode assembly 18. This limits the depositing of the metallic lithium caused by a portion of the positive electrode application portion 26a that does not face the negative electrode application portion 36a.

The rechargeable battery 10 according to the present embodiment includes the insulating member 43 with the sandwiching portion 46 configured by the two insulating portions 45, which sandwich the corresponding positive electrode lead portion 24. The insulating portions 45 that configure the sandwiching portion 46 are located at least between the positive electrode border 26c and the negative electrode border 36c when viewed in the stacking direction of the electrode assembly 18. That is, in addition to the separator 19, each insulating portion 45 is located between the positive electrode lead portion 24 and the negative electrode application portion 36a. This prevents contact, i.e., short-circuit between the positive electrode lead portion 24 and the negative electrode application portion 36a even if the separator 19 is melted due to heating of the rechargeable battery 10 or the separator 19 is damaged due to an external force.

The insulating member 43 is coupled to the positive current collector 28 of the electrode assembly 18 such that the sandwiching portion 46 sandwiches the corresponding positive electrode lead portion 24. This provides an insulating portion 45 between each positive electrode lead portion 24 and the corresponding negative electrode application portion 36a. Accordingly, each insulating portion 45 is provided between the corresponding positive electrode lead portion 24 and the negative electrode application portion 36a in each case of before and after connecting the positive current collection terminal 40 to the positive electrode lead portions 24 (positive current collector 28).

In the present embodiment, the entire range of the positive electrode lead portion 24 between the positive electrode border 26c and the negative electrode border 36c is covered by the sandwiching portion 46 (two insulating portions 45). This reliably prevents short-circuit between the positive electrode lead portion 24 and the negative electrode application portion 36a (negative active material layer 36) even if the separator 19 is melted or damaged.

Since the size of each insulating portion 45 in the right-left direction according to the present embodiment is greater than the size of the positive electrode lead portion 24 in the width direction, each insulating portion 45 covers the corresponding positive electrode lead portion 24 over the entire range in which the positive electrode border 26c extends. This reliably prevents short-circuit between the positive electrode lead portion 24 and the negative electrode application portion 36a (negative active material layer 36) in the present embodiment.

In the present embodiment, the formula $L<Ta2$ and the formula $Ta1 \leq La \leq Ta1+(Ta2-L) \times 2$ are established where the thickness of each insulating portion 45 is denoted by L, the distance between the two insulating portions 45 is denoted by La, the thickness of the positive electrode metal foil 22 is denoted by Ta1, and the thickness of the positive active material layer 26 is denoted by Ta2 in the stacking direction of the electrode assembly 18.

Accordingly, the space defined between the positive electrode metal foil 22 and the separator 19 accommodates the two insulating portions 45 that sandwich the corresponding positive electrode lead portion 24 (positive electrode non-application portion 26b) such that the insulating portions 45 that form the sandwiching portion 46 are free from the contact with the separator 19 and the positive electrode metal foil 22.

For example, if the distance La between the two insulating portions 45 is less than Ta1, the two insulating portions 45 and the corresponding positive electrode lead portion 24 contact each other. This makes it difficult to couple the insulating member 43 to the positive current collector 28 (electrode assembly 18) such that the two insulating portions 45 sandwich the corresponding positive electrode lead portion 24.

In contrast, if the distance La between the two insulating portions 45 is greater than $Ta1+(Ta2-L) \times 2$, the outer surface of each of the two insulating portions 45 in the stacking direction of the electrode assembly 18 contacts the facing separator 19 that is adjacent to the corresponding surface of the positive electrode sheet 21. This makes it difficult to couple the insulating member 43 to the electrode assembly 18. According to the present embodiment, the insulating member 43 has a size that satisfies the above relationships (formulas) to solve the problems to facilitate the coupling of the insulating member 43 to the electrode assembly 18.

The formula $L<Ta2$ and the formula $Tb1+(Tb2+Ts) \times 2 \leq Lb \leq Tb1+(Tb2+Ts+Ta2-L) \times 2$ are established where the distance between the adjacent pair of the sandwiching portions 46 is denoted by Lb, the thickness of each insulating portion is denoted by L, the thickness of the positive active material layer 26 is denoted by Ta2, the thickness of the negative electrode metal foil 32 is denoted by Tb1, the thickness of the negative active material layer 36 is denoted by Tb2, and the thickness of the separator is denoted by Ts in the stacking direction of the electrode assembly 18.

Accordingly, the space defined between the positive electrode metal foil 22 and the separator 19 accommodates the corresponding one of the two insulating portions 45 that configure one of the two sandwiching portions 46 that are adjacent to each other such that the insulating portions 45 are free from the contact with the separators 19 and the positive electrode metal foils 22.

For example, if the distance Lb between each adjacent pair of the sandwiching portions 46 is less than $Tb1+(Tb2+Ts) \times 2$, each separator 19 that is adjacent to the negative electrode sheet 31 contacts the corresponding insulating portion 45 between the adjacent pair of the sandwiching portions 46. This makes it difficult to couple the insulating member 43 to the electrode assembly 18.

In the same way, if the distance Lb between each adjacent pair of the sandwiching portions 46 is greater than $Tb1+(Tb2+Ts+Ta2-L) \times 2$, each of the insulating portions 45 of the adjacent pair of the sandwiching portions 46 contacts the corresponding one of the positive electrode lead portions 24 of the positive electrode sheets 21 that are adjacent to each other across the negative electrode sheet 31 and the separators 19 located between the adjacent pair of the sandwiching portions 46. This makes it difficult to couple the insulating member 43 to the electrode assembly 18. According to the present embodiment, the insulating member 43 has a size that satisfies the above relationships (formulas) to solve the problems to facilitate the coupling of the insulating member 43 to the electrode assembly 18.

Accordingly, the present embodiment has the following advantages.

(1) The positive electrode lead portions 24 and the negative electrode lead portions 34 are located at the same side in the electrode assembly 18, and the positive electrode border 26c is located closer to the negative electrode application portion 36a than the negative electrode border 36c. This limits the depositing of the metallic lithium caused by a portion of the positive electrode application portion 26a that does not face the negative electrode application portion 36a. According to the present embodiment, each insulating portion 45 is located between a positive electrode lead portion 24 and the corresponding negative electrode application portion 36a. This prevents short-circuit, i.e., contact between the positive electrode lead portion 24 and the negative electrode application portion 36a even if the separator 19 is melted due to heating of the rechargeable battery 10 or the separator 19 is damaged due to an external force. The insulating member 43 is coupled to the positive current collector 28 of the electrode assembly 18. This provides an insulating portion 45 between each positive electrode lead portion 24 and the corresponding negative electrode application portion 36a. Accordingly, the insulating portion 45 is provided between the positive electrode lead portion 24 and the negative electrode application portion 36a in each case of before and after connecting the positive current collection terminal 40 to the positive electrode lead portions 24 (positive current collector 28). This increases the flexibility of the manufacturing process and facilitates the manufacturing.

(2) According to the present embodiment, the entire range of the positive electrode lead portion 24 between the positive electrode border 26c and the negative electrode border 36c is covered by the insulating portions 45. This reliably prevents short-circuit between the positive electrode lead portion 24 and the negative electrode application portion 36a (negative active material layer 36).

(3) The formula L<Ta2 and the formula Ta1≤La≤Ta1+(Ta2−L)×2 are established where the thickness of each insulating portion 45 is denoted by L, the distance between the two insulating portions 45 is denoted by La, the thickness of the positive electrode metal foil 22 is denoted by Ta1, and the thickness of the positive active material layer 26 is denoted by Ta2 in the stacking direction of the electrode assembly 18. This locates the insulating portion 45 in the sandwiching portion 46 in the range of the thickness Ta2 of the positive active material layer 26 in the stacking direction of the electrode assembly 18. Accordingly, in the present embodiment, when coupling the insulating member 43 to the positive current collector 28 (electrode assembly 18), contact between each insulating portion 45 and the corresponding positive electrode lead portion 24 or the corresponding separator 19 is prevented. This facilitates the coupling of the insulating member 43 to the electrode assembly 18.

(4) The formula L<Ta2 and the formula Tb1+(Tb2+Ts)×2≤Lb≤Tb1+(Tb2+Ts+Ta2−L)×2 are established where the thickness of each insulating portion is denoted by L, the distance between the adjacent pair of the sandwiching portions 46 is denoted by Lb, the thickness of the positive active material layer 26 is denoted by Ta2, the thickness of the negative electrode metal foil 32 is denoted by Tb1, the thickness of the negative active material layer 36 is denoted by Tb2, and the thickness of the separator is denoted by Ts. This locates the insulating portions 45 that configure the sandwiching portion 46 in the range of the thickness Ta2 of the positive active material layer 26 in the stacking direction of the electrode assembly 18 in the state where the separators 19 and the negative electrode sheet 31 are located between the adjacent pair of the sandwiching portions 46. Accordingly, in the present embodiment, when coupling the insulating member 43 to the positive current collector 28 (electrode assembly 18), contact between each of the insulating portions 45 that configure the adjacent pair of the sandwiching portions 46 and the corresponding positive electrode lead portion 24 or the corresponding separator 19 is prevented. This facilitates the coupling of the insulating member 43 to the electrode assembly 18.

(5) Each positive electrode non-application portion 26b (positive electrode lead portion 24) is covered by an insulating portion 45 over the entire range in which the positive electrode border 26c extends. This reliably prevents short-circuit between the positive electrode lead portion 24 and the negative electrode application portion 36a (negative active material layer 36) in the present embodiment.

(6) In the rechargeable battery 10, short-circuit between the positive electrode lead portion 24 and the negative electrode application portion 36a is prevented and the manufacturing is facilitated.

(7) In the insulating member 43 according to the present embodiment, the sandwiching portions 46 are connected by the coupling portion 44. For example, if the sandwiching portions 46 are separate from each other, it is necessary to couple each sandwiching portion 46 to the positive current collector 28. In contrast, in the present embodiment, the insulating member 43 is coupled to the positive current collector 28 to connect the sandwiching portions 46 at once.

(8) Since the same number of the sandwiching portions 46 are provided in the insulating member 43 as the number of the positive electrode lead portions 24 (positive electrode sheets 21), which configure the positive current collector 28, each insulating portion 45 is provided between the corresponding positive electrode lead portion 24 and the negative electrode application portion 36a according to a single coupling operation.

The embodiment is not limited to the foregoing description. For example, the embodiment may be modified as follows.

Figure 7:
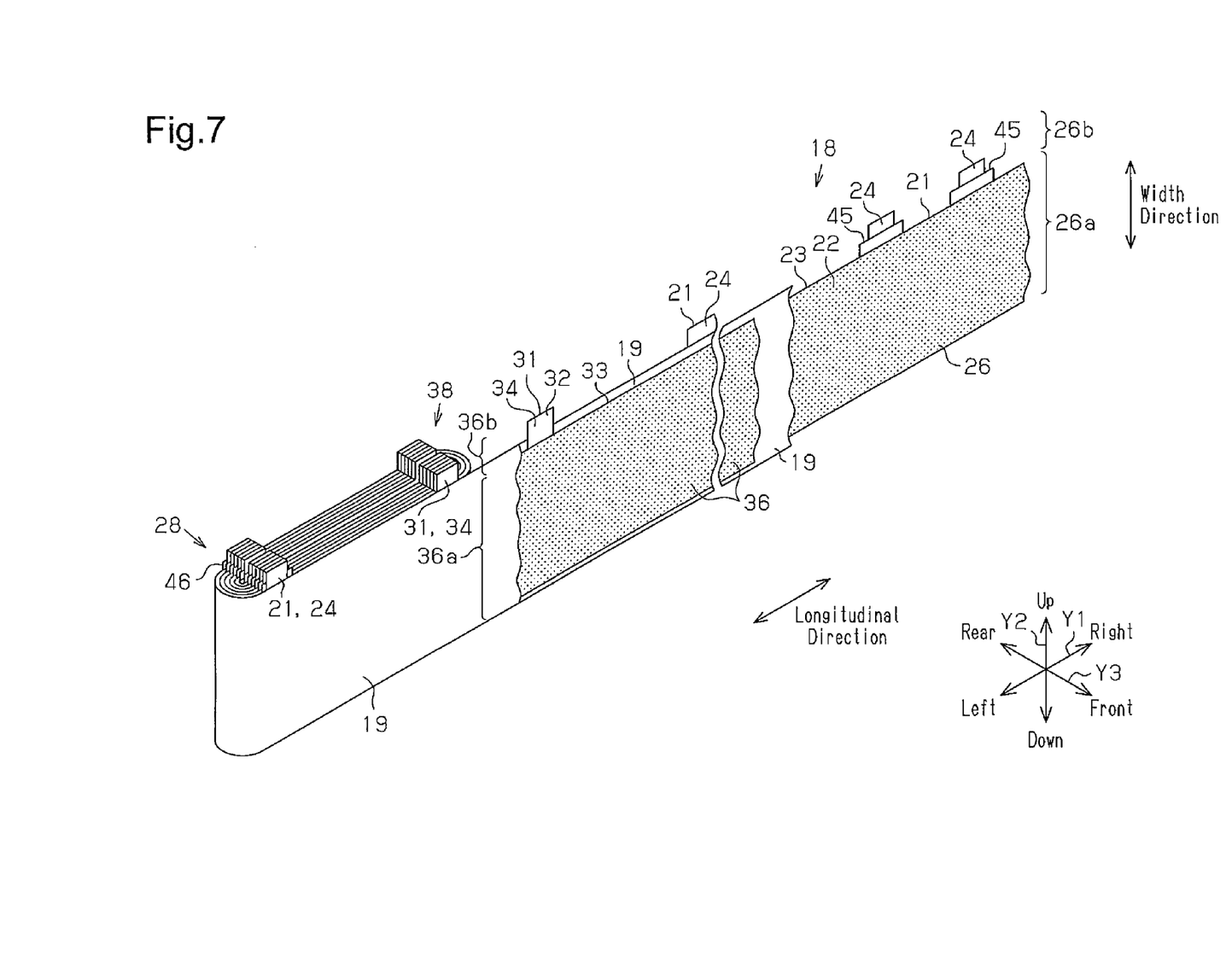
FIG. 7 is a partially exploded perspective view schematically illustrating an electrode assembly according to another embodiment.

As shown in FIG. 7, the positive electrode sheet 21, the negative electrode sheet 31, and the separator 19 may be strip-like, namely, elongated sheet-like. The electrode assembly 18 may be configured such that the positive electrode sheet 21 and the negative electrode sheet 31, with the separator 19 arranged in between, are wound in a rolled manner so that the positive electrode sheet 21 and the negative electrode sheet 31 have a layered structure. In this case, in the positive electrode upper edge 23 of the positive electrode sheet 21, the positive electrode lead portions 24 each extend at a predetermined interval in the longitudinal direction of the positive electrode sheet 21. In the negative electrode upper edge 33 of the negative electrode sheet 31, the negative electrode lead portions 34 each extend at a predetermined interval in the longitudinal direction of the negative electrode sheet 31. By winding and stacking the positive electrode sheet 21 and the negative electrode sheet 31, the positive current collector 28, which has a layered structure formed by stacking a plurality of the positive electrode lead portions 24 without sandwiching the separator 19, extends upward at the left side of the upper edge portion in the electrode assembly 18. The negative current collector 38, which has a layered structure formed by stacking the negative electrode lead portions 34 without sandwiching the separator 19 is formed at the right side of the upper edge portion in the electrode assembly 18.

Figure 8:
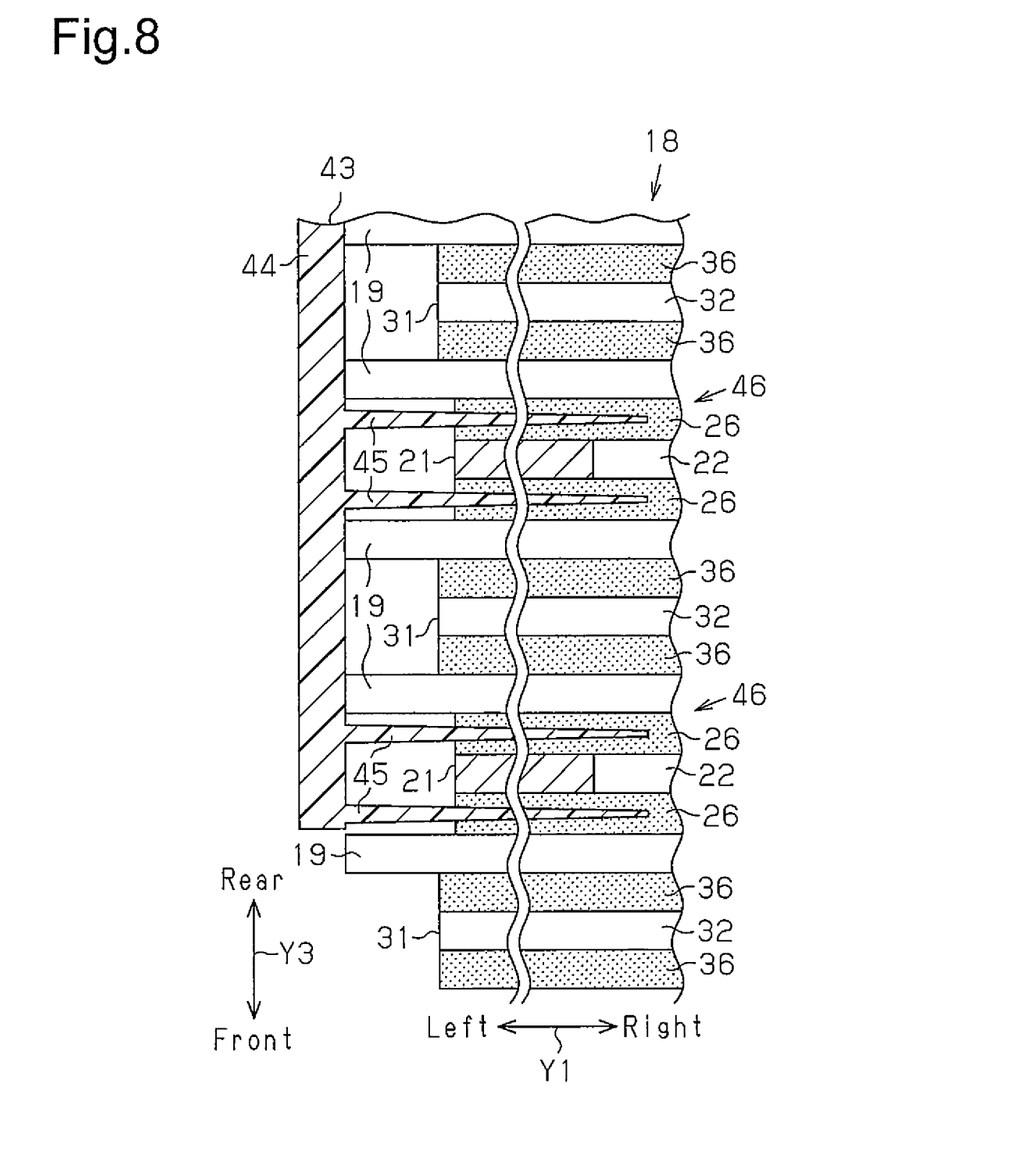
FIG. 8 is a cross-sectional view illustrating an electrode assembly according to yet another embodiment.

As shown in FIG. 8, the insulating portions 45 that configure each sandwiching portion 46 may be formed such that the cross-sectional area of the insulating portions 45 is reduced in the direction perpendicular to the direction (right-left direction) in which the insulating portions 45 extend, that is, may be tapered from the coupling portion 44 (basal end) toward the distal end. This prevents contact between the tip end of each insulating portion 45 and an edge of the corresponding positive electrode lead portion 24 or the corresponding separator 19, and facilitates the coupling of the insulating member 43 to the positive current collector 28 (electrode assembly 18) when coupling the insulating member 43 to the positive current collector 28 (electrode assembly 18).

The insulating member 43 may include one sandwiching portion 46. The number of the sandwiching portions 46 included in the insulating member 43 may be different from the number of the positive electrode lead portions 24 (positive electrode sheets 21), which form the positive current collector 28. For example, if the positive active material is not applied to the outer surface of the positive electrode non-application portion 26b as an outermost layer in the electrode assembly 18, it is not necessary to provide the negative electrode metal foil 32 on the outer surface. Accordingly, in this case, it is not necessary to provide the insulating portion 45 on the outer surface of the positive electrode non-application portion 26b as an outermost layer. Alternatively, a predetermined ratio of the sandwiching portions 46 may be provided with respect to the number of the positive electrode metal foils 22. As for the predetermined ratio, the number Y of the sandwiching portions 46 with respect to the number X of the positive electrode metal foils 22 is obtained from Y1=X/Z or Y1=X/Z. Here, X and Z are arbitrary integers. If Y1 is an integer, Y1 is used as Y. If Y1 is not an integer, the decimal point of Y1 is rounded up, down or off to the nearest integer to be a value of Y.

The two surfaces of the positive electrode metal foil 22 each may have the positive electrode non-application portion 26b along the positive electrode upper edge 23. In this case, when viewed in the stacking direction of the electrode assembly 18, the insulating portion 45 may be located between the positive electrode non-application portion 26b and the negative electrode application portion 36a only in the range in which at least the positive electrode lead portion 24 extends in the lateral direction. The size of each insulating portion 45 of the insulating member 43 in the right-left direction may be greater than the size of the positive electrode upper edge 23. The insulating portion 45 may be located over the entire range between the positive electrode non-application portion 26b and the negative electrode application portion 36a.

The two surfaces of the negative electrode metal foil 32 each may have the negative electrode non-application portion 36b along the negative electrode upper edge 33. The negative electrode border 36c may be arranged on the surface of the negative electrode lead portion 34.

The upper end portion of each insulating portion 45 may be arranged below the upper edge of the separator 19 (on the positive electrode border 26c side), and may be arranged below the upper end portion of the negative electrode metal foil 32 (negative electrode application portion 36a) (on the positive electrode border 26c side). That is, the position of each insulating portion 45 may be changed as long as it is located at least between the positive electrode border 26c and the negative electrode border 36c when viewed in the stacking direction of the electrode assembly 18.

The shapes of the positive electrode lead portion 24 and the negative electrode lead portion 34 may be appropriately changed.

The positive electrode lead portion 24 (positive current collector 28) and the negative electrode lead portion 34 (negative current collector 38) may extend from the end portion in the right-left direction or the lower end portion of electrode assembly 18.

The positive electrode metal foil 22 is used as the positive electrode thin metal board, and the negative electrode metal foil 32 is used as the negative electrode thin metal board. However, a thin board that has sufficient thickness for maintaining the battery capacity (electric capacity) in the rechargeable battery 10 and having no influence on manufacturing of the battery may be used as the positive electrode thin metal board and the negative electrode thin metal board.

The electrode assembly 18 may be formed by locating and stacking the positive electrode sheet 21 and the negative electrode sheet 31 between the separators 19 that are folded into an accordion-like or zigzag shape.

The number of the positive electrode sheets 21 and the negative electrode sheets 31, which form the electrode assembly 18, may be appropriately changed. For example, the electrode assembly 18 may include a single positive electrode sheet 21 and a single negative electrode sheet 31.

The shape of the case 11 may be cylindrical or elliptic cylindrical that is elongated and has a low profile in the right-left direction.

The rechargeable battery 10 of the above embodiment may be mounted on a vehicle (for example, an industrial vehicle or a passenger vehicle). In this case, a compressor for an air conditioner, an electric motor used to drive wheels, and electric components such as an automotive navigation system may be driven by electric power supplied from the rechargeable battery 10 as the rechargeable battery 10 is charged by a power generator installed on the vehicle. This prevents short-circuit between the positive electrode lead portion 24 and the negative electrode application portion 36a (negative active material layer 36) in the rechargeable battery 10 and facilitates the manufacturing. This improves the safety as a vehicle mounting the rechargeable battery 10, reduces the time required for the manufacturing and the cost.

The present invention may be embodied by a nickel hydrogen rechargeable battery as a rechargeable battery and a power storage device. Further, the present invention may be embodied as an electric double-layer capacitor as a power storage device. That is, the present invention is applicable to a power storage device that has a structure capable of being charged and discharged.

The invention claimed is:
1. A power storage device comprising:
one or more positive electrodes;
one or more negative electrodes;
one or more separators each located between a positive electrode and a negative electrode to insulate the positive electrode and the negative electrode from each other; and
an electrode assembly formed by stacking the positive electrodes, the negative electrodes, and the separators, wherein
each positive electrode includes a positive electrode metal thin board, a positive electrode application portion formed by applying a positive active material on a surface of the positive electrode metal thin board, a positive electrode non-application portion that is free from the positive active material, and a positive electrode border as a border between the positive electrode application portion and the positive electrode non-application portion,
each negative electrode includes a negative electrode metal thin board, a negative electrode application portion formed by applying a negative active material on a surface of the negative electrode metal thin board, a negative electrode non-application portion that is free from the negative active material, and a negative electrode border as a border between the negative electrode application portion and the negative electrode non-application portion,
each positive electrode non-application portion and the negative electrode non-application portion are located at the same side in the electrode assembly, and the positive electrode border is included in the negative electrode application portion as viewed from a front view of the negative electrode,
the power storage device further comprises an insulating member including one or more sandwiching portions, wherein each sandwiching portion is formed by two insulating portions that sandwich the positive electrode non-application portion from both sides in a stacking direction of the electrode assembly, and
when viewed in cross-section of the stacking direction of the electrode assembly, each insulating portion is arranged at least between the positive electrode border and the negative electrode border,
the number of the sandwiching portions included in the insulating member corresponds to the number of the positive electrodes, which form the electrode assembly, and
a formula $L<Ta2$ and a formula $Ta1 \leq La \leq Ta1+(Ta2-L) \times 2$ are established where
when viewed in cross-section of the stacking direction, the thickness of each insulating portion in the stacking direction is denoted by L, the distance between the two insulating portions of the respective sandwiching portion in the stacking direction is denoted by La, the thickness of the positive electrode metal thin board is denoted by Ta1, and the thickness of the positive active material layer in the positive electrode application portion is denoted by Ta2.

2. The power storage device according to claim 1, wherein each insulating portion covers an entire range of the positive electrode non-application portion between the positive electrode border and the negative electrode border when viewed in the stacking direction.

3. The power storage device according to claim 1, wherein the number of the sandwiching portions included in the insulating member corresponds to the number of the positive electrodes, which form the electrode assembly, and a formula $L<Ta2$ and a formula $Tb1+(Tb2+Ts)\times 2 \leq Lb \leq Tb1+(Tb2+Ts+Ta2-L)\times 2$ are established where a thickness of each insulating portion is denoted by L, a distance between an adjacent pair of the sandwiching portions is denoted by Lb, a thickness of the positive active material layer in the positive electrode application portion is denoted by Ta2, a thickness of the negative electrode metal thin board is denoted by Tb1, a thickness of the negative active material layer in the negative electrode application portion is denoted by Tb2, and a thickness of the separator is denoted by Ts.

4. The power storage device according to claim 1, wherein each insulating portion covers the positive electrode non-application portion in an entire range in which the positive electrode border extends.

5. The power storage device according to claim 1, wherein
the insulating member includes coupling portions, each coupling portion connecting the insulating portions forming one of the sandwiching portion to each other, and each insulating portion extends from the coupling portion along the positive electrode non-application portion, and is tapered with a cross-sectional area reduced from a basal end portion to a distal end portion of the insulating portion in a direction perpendicular to the direction in which the insulating portion extends.

6. The power storage device according to claim 1, wherein the power storage device is a rechargeable battery.

* * * * *